(12) United States Patent
Robison

(10) Patent No.: US 10,963,980 B2
(45) Date of Patent: *Mar. 30, 2021

(54) SYSTEM AND METHOD OF ALERTING AND RESPONDING TO A SCHOOL EMERGENCY

(71) Applicant: Mike Robison, Coto de Caza, CA (US)

(72) Inventor: Mike Robison, Coto de Caza, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/917,871

(22) Filed: Jun. 30, 2020

(65) Prior Publication Data

US 2020/0334780 A1 Oct. 22, 2020

Related U.S. Application Data

(63) Continuation-in-part of application No. 16/294,644, filed on Mar. 6, 2019, now Pat. No. 10,699,555.

(60) Provisional application No. 62/673,613, filed on May 18, 2018.

(51) Int. Cl.
| | |
|---|---|
| *G06Q 50/26* | (2012.01) |
| *G06Q 50/20* | (2012.01) |
| *G06Q 10/10* | (2012.01) |
| *G01S 19/42* | (2010.01) |
| *G08B 27/00* | (2006.01) |
| *G08B 25/12* | (2006.01) |

(52) U.S. Cl.
CPC .......... *G06Q 50/265* (2013.01); *G01S 19/42* (2013.01); *G06Q 10/105* (2013.01); *G06Q 50/205* (2013.01); *G08B 25/12* (2013.01); *G08B 27/001* (2013.01); *G08B 27/005* (2013.01)

(58) Field of Classification Search
CPC .......................... H04L 12/1895; H04W 4/021
USPC ........................................................ 340/524
See application file for complete search history.

(56) References Cited

U.S. PATENT DOCUMENTS

| | | | | |
|---|---|---|---|---|
| 2005/0091368 A1* | 4/2005 | Ozburn | ................. | H04L 63/083 709/224 |
| 2012/0329420 A1* | 12/2012 | Zotti | ................. | H04M 1/72541 455/404.2 |
| 2015/0365246 A1* | 12/2015 | Kane | .................... | H04L 51/046 709/203 |

* cited by examiner

*Primary Examiner* — Fabricio R Murillo Garcia

(57) ABSTRACT

A system and method of alerting and responding to a school emergency allows faculty members to alert other faculty members and students of an educational institution of an emergency all at the same time. Moreover, the method allows faculty members to automatically contact a first responder in order to resolve the emergency. The faculty member is able to include details of an emergency such as, but not limited to, the location of the emergency and the type of emergency situation. Additionally, the method notifies parents after the emergency is resolved and provides a feature which allows parents to find their children using a global positioning system (GPS) module.

12 Claims, 12 Drawing Sheets

SYSTEM AND METHOD OF ALERTING AND RESPONDING TO A SCHOOL EMERGENCY

The current application is a continuation-in-part (CIP) application of a U.S. non-provisional application Ser. No. 16/294,644 filed on Mar. 6, 2019. The U.S. non-provisional application Ser. No. 16/294,644 claims a priority to a U.S. provisional application Ser. No. 62/673,613 filed on May 18, 2018.

FIELD OF THE INVENTION

The present invention generally relates to emergency alerts and emergency response systems. More specifically, the present invention relates to an emergency alert and response system improved to minimize tragedies during/after emergencies on educational institutions.

BACKGROUND OF THE INVENTION

School emergencies happen often and include a wide range of situations. From medical emergencies to school shootings, school emergencies can happen anytime and require vast preparedness from everyone involved. Unfortunately, the unpredictable nature of school emergencies impedes full preparedness for every emergency which may occur in schools. Recent school shootings have highlighted this problem where students, faculty, and staff are caught by surprise, not knowing what was happening or where it was occurring, and emergency response was delayed. Schools and other educational institutions have implemented emergency plans, drills, and other proactive actions to prepare everyone who may be involved in an emergency to know what to do and hopefully help alleviate the tragedies. Unfortunately, the emergency plans, drills, and other proactive actions cannot cover every possible situation, which can leave students, faculty, and staff unprepared for many situations. Response systems have also been implemented to reduce and improve emergency response to school emergencies. For example, some law enforcement agencies have implemented direct communication channels with schools. However, these response systems have limited capabilities with few people being able to activate the response system. There are many cases where an emergency occurs at a location far from anyone able to activate the response system, which results in emergency response being delayed and tragedies increasing. There is a need for a better emergency alert and response system which allows greater involvement from different people in order to increase emergency alertness, identify where the emergency is taking place, and improve emergency response to school emergencies to reduce tragedies.

An objective of the present invention is to provide an emergency alert and response system. The emergency alert and response system allows for greater involvement from people in schools and other educational institutions in order to increase alertness from everyone who may be affected by a school emergency. The emergency alert and response system provide a system which increases and facilitates the dissemination of information regarding the school emergency so every person who could be affected by the emergency is notified as to exact nature of the emergency and the exact location that it is occurring. By communication in real time, the emergency alert and response system further provide a system which facilitates and streamlines the communication between people involved, affected, or alerted of the emergency with appropriate law enforcement or other response agencies. In further embodiment of the present invention, the emergency alert and response system can be modified and adapted to work with other emergencies which may not be involved with educational institutions.

SUMMARY OF THE INVENTION

The present invention is an emergency alert and response system. The emergency alert and response system provides faculty and staff administrative clearance so when they realize there is a potential risk or danger, the faculty and staff can activate the alert and response system. The emergency alert and response system provides a software application which provides a plurality of options which correspond to specific emergency situations. Not only will students and staff be notified when and where an emergency occurs, but local law enforcement and other response personnel will be notified all at the same time. In the preferred embodiment of the present invention, students can only relay information to the faculty and school administrators. The emergency alert and response system further utilizes a location feature where parents can know the exact location, within five feet, of where their children are, once the emergency is over, and the "All Clear" notification alert has been activated. The application of the emergency alert and response system provides an alert system, which in the event of an emergency, eliminates confusion between affected users and law enforcement and/or emergency responders.

DETAIL DESCRIPTIONS OF THE INVENTION

All illustrations of the drawings are for the purpose of describing selected versions of the present invention and are not intended to limit the scope of the present invention.

Figure 1:
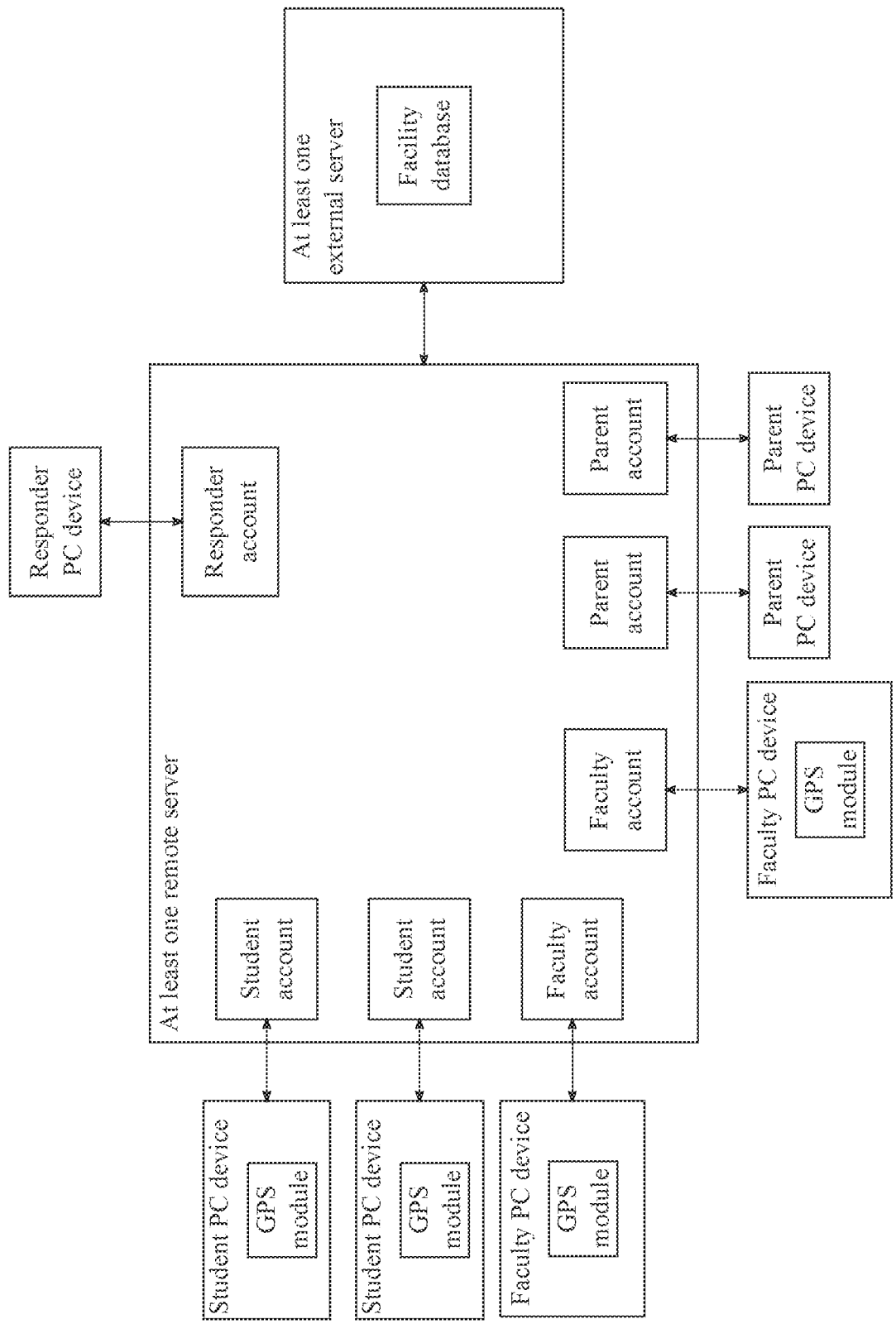
FIG. 1 is a block diagram displaying the system of the present invention.

In reference to FIGS. 1 through 12, the present invention is a system and method of alerting and responding to a school emergency. The present invention is an alert and response software application that preferably pertains to the faculty of an educational institution, the students, and their parents. In further detail, through the present invention, the faculty of an educational institution, the students, and their parents can be alerted of potential danger or medical emergencies occurring on the grounds of the educational institution. With reference to FIG. 1, the system of the present invention is provided with at least one remote server. The remote server is used to manage a plurality of faculty accounts (Step A) and a plurality of student accounts (Step B). The plurality of faculty accounts is a set of user accounts which are available for each faculty member who is employed by the educational institution. The plurality of student accounts is a set of user accounts which are available for the students who attend the educational institution. The remote server is used as a hub where information can be exchanged between the faculty accounts and the student accounts, to store important data provided by the faculty accounts and the students accounts, and to manage the administrative processes of the present invention. Each faculty account is associated with a corresponding faculty personal computing (PC) device among a plurality of faculty PC devices. The faculty PC device may any type of computing device such as, but not limited to, a desktop computer, a mobile device, a smartphone, or an electronic tablet. Similarly, each student account is associated with a corresponding student PC device among a plurality of student PC devices. The student PC device may be any type of computing device such as, but not limited to, a desktop computer, a mobile device, a smartphone, or electronic tablet. Moreover, at least one responder account is also managed by the remote server (Step C). The responder account is associated with a responder PC device. The responder account belongs to member of an emergency response provider such as, but not limited to, paramedics, law enforcement officials, or firefighters. The present invention is primarily for emergencies at educational institutions but can be used for emergencies at other locations such as, but not limited to, business buildings, hospitals, or places of worship.

Figure 2:
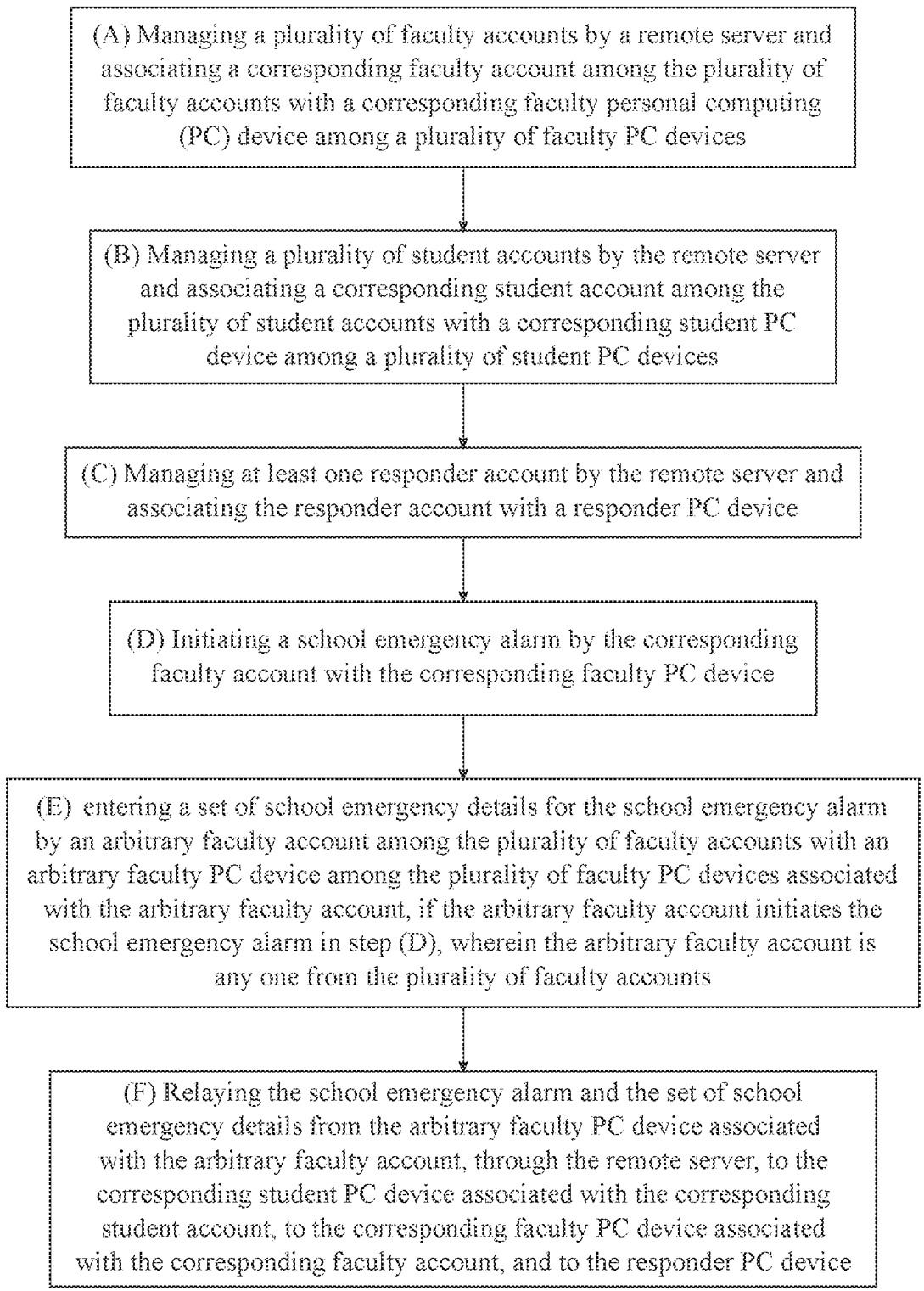
FIG. 2 is a flowchart displaying the overall process for the method of the present invention.

With reference to FIG. 2, the method of alerting and responding to a school emergency follows an overall process that allows the faculty of an educational institution, the students, and their parents to be alerted of potential danger or medical emergencies occurring on the grounds of the educational institution. The corresponding faculty PC device prompts each faculty account to initiate a school emergency alarm (Step D). The school emergency alarm is a digital notification that alerts each faculty account, and each student account of an emergency and the location the emergency is occurring. Only a faculty account can initiate the school emergency alarm. Student accounts do not have credentials to initiate the school emergency alarm in order to prevent any false school emergency alarms. The corresponding faculty PC device then prompts an arbitrary faculty account among the plurality of faculty accounts to enter a set of school emergency details for the school emergency alarm with an arbitrary faculty PC device among the plurality of faculty PC devices associated with the arbitrary faculty account, if the arbitrary faculty account initiates the school emergency alarm in Step D (Step E). The set of school emergency details is information that describes the emergency such as, but not limited to, the location of the emergency and the type of emergency situation. The school emergency alarm and the set of school emergency details is relayed from the arbitrary faculty PC device associated with the arbitrary faculty account, through the remote server, to the corresponding student PC device associated with the corresponding student account, to the corresponding faculty PC device associated with the corresponding faculty account, and to the responder PC device (Step F). This step allows everybody in an educational institution to be aware of an emergency and notifies first responders of the emergency. The school emergency alarm and the set of school emergency details is preferably displayed in a text format on the corresponding student PC device of each student account, the corresponding faculty PC device of each faculty account in order to prepare and/or warn the users of each student account and each faculty account of an emergency. Moreover, the school emergency alarm and the set of school emergency details is preferably sent to the responder PC device as a text-to-voice message. Additionally, the arbitrary faculty account is given the option to automatically initiate a phone conversation through the remote server in order to speak directly to the responder account if it is safe for the arbitrary faculty account to speak.

Figure 3:
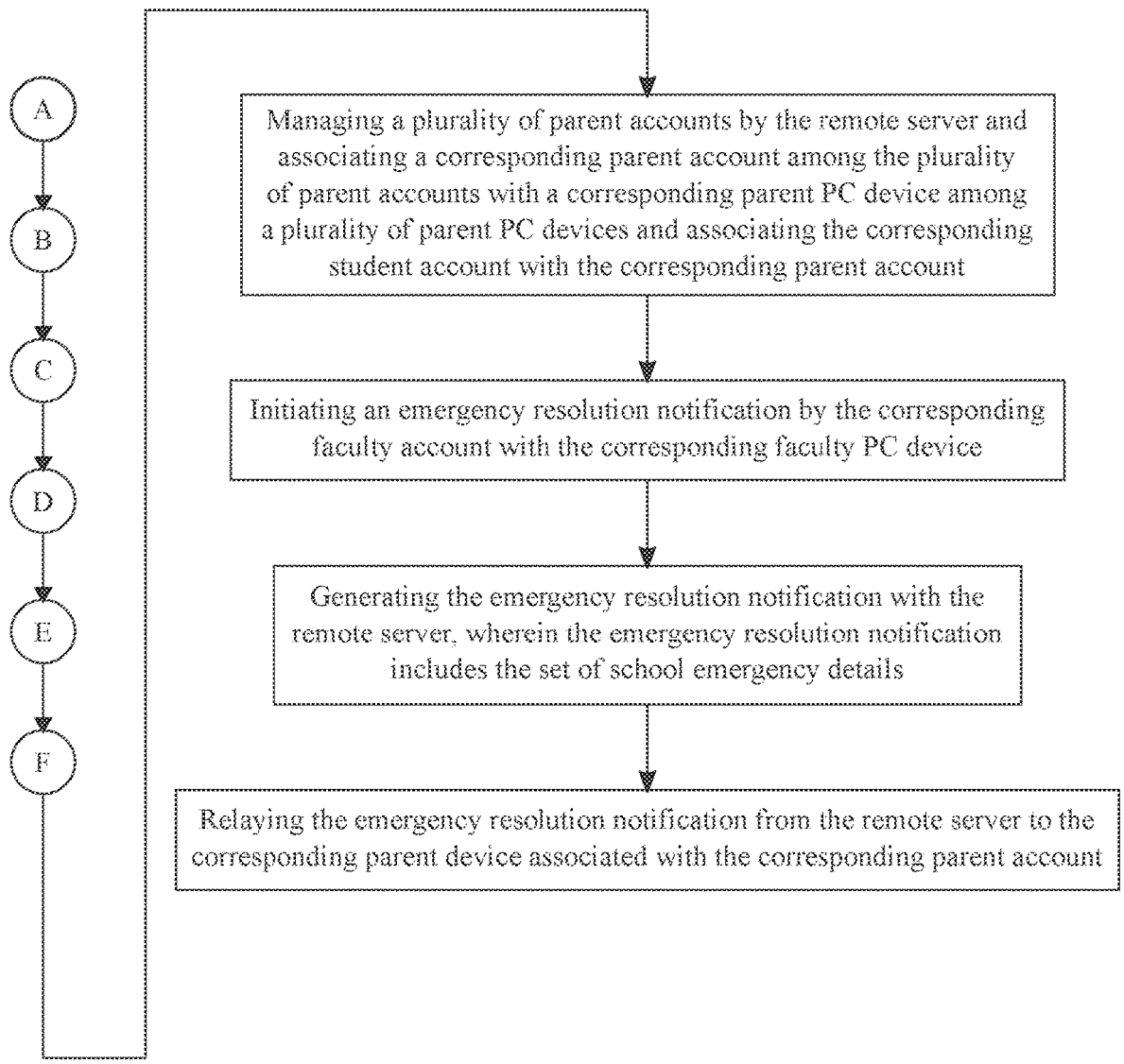
FIG. 3 is a flowchart displaying a subprocess for how a parent gets notified after an emergency.

With reference to FIG. 3, the remote server is further used to manage a plurality of parent accounts. The plurality of parent accounts is a set of user accounts available for parents of students who attend an educational institution. Each parent account is associated with a corresponding parent PC device among a plurality of parent PC devices. The parent PC device may be any type of computing device such as, but not limited to, a desktop computer, a mobile device, a smartphone, or an electronic tablet. Moreover, the corresponding student account is associated with the corresponding parent account. Preferably, only parents with students who attend an education institution are allowed to create a parent account. The corresponding faculty PC device prompts each faculty account to initiate an emergency resolution notification. The emergency resolution notification is used to notify parents with a parent account of an emergency and that the emergency has been resolved. Parents with a parent account are only notified after the emergency has been resolved in order to prevent unnecessary action from parents with a parent account. The remote server generates the emergency resolution notification. The emergency resolution notification includes the set of school emergency details in order for parents with a parent account to be fully informed of the emergency. The emergency resolution notification is relayed from the remote server to the corresponding parent device associated with the corresponding parent account. The emergency resolution notification is preferably displayed in a text format on the corresponding parent device of each parent account.

Figure 4:
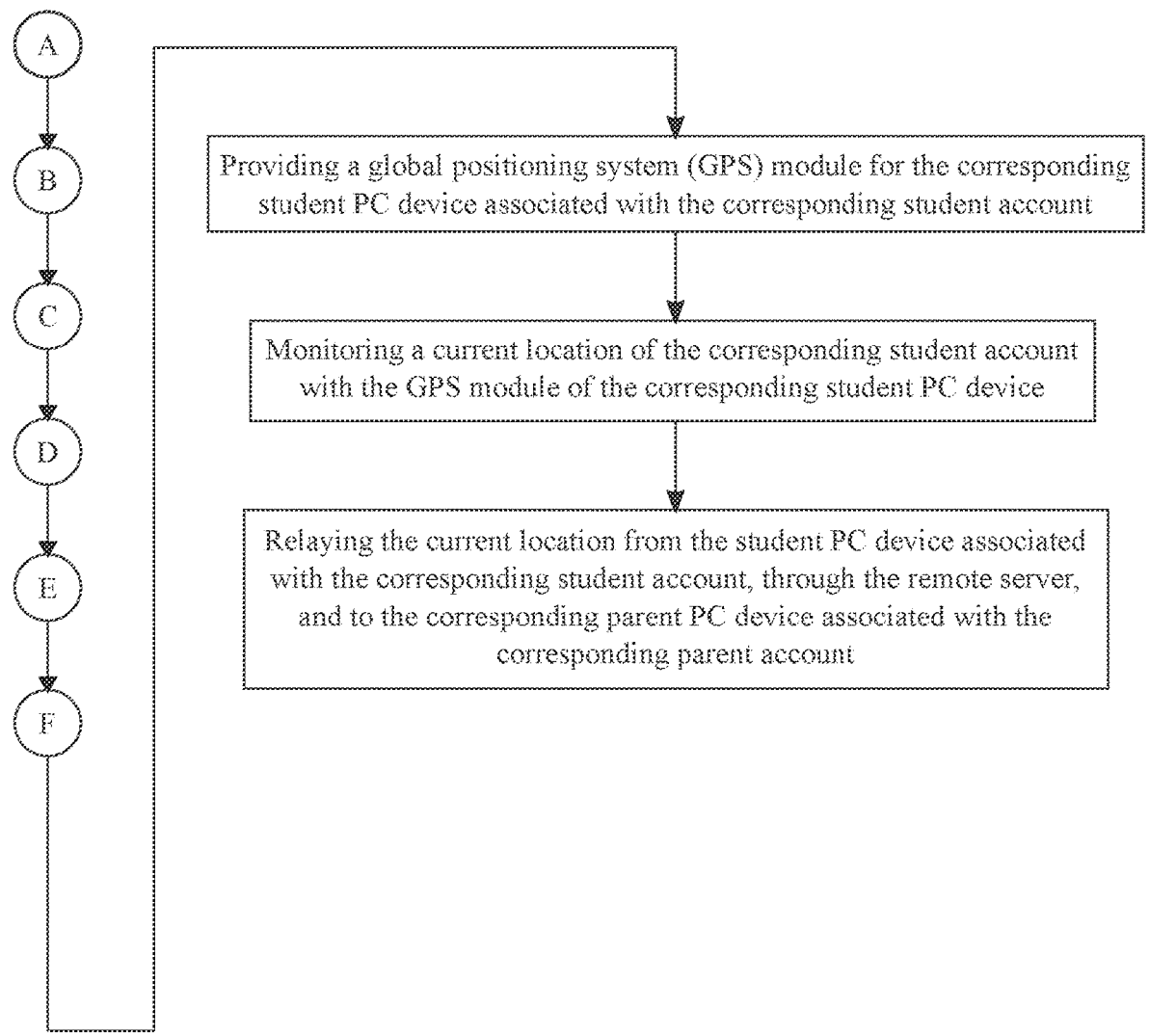
FIG. 4 is a flowchart displaying a subprocess how a parent can location his or her child after an emergency.

With reference to FIG. 4, the corresponding student PC device of each student account preferably includes a global positioning system (GPS) module. Due to this, the student PC device is preferably a mobile device that includes a GPS module. The GPS module of the corresponding student PC device monitors a current location associated with the corresponding student account. The current location is the physical positioning of the corresponding student PC device of each student account. The current location is relayed from the student PC device associated with the corresponding student account, through the remote server, and to the corresponding parent PC device associated with the corresponding parent account. This allows a parent with a parent account to easily and efficiently locate his or her child (children) after an emergency has been resolved and the emergency resolution notification has been initiated.

Figure 5:
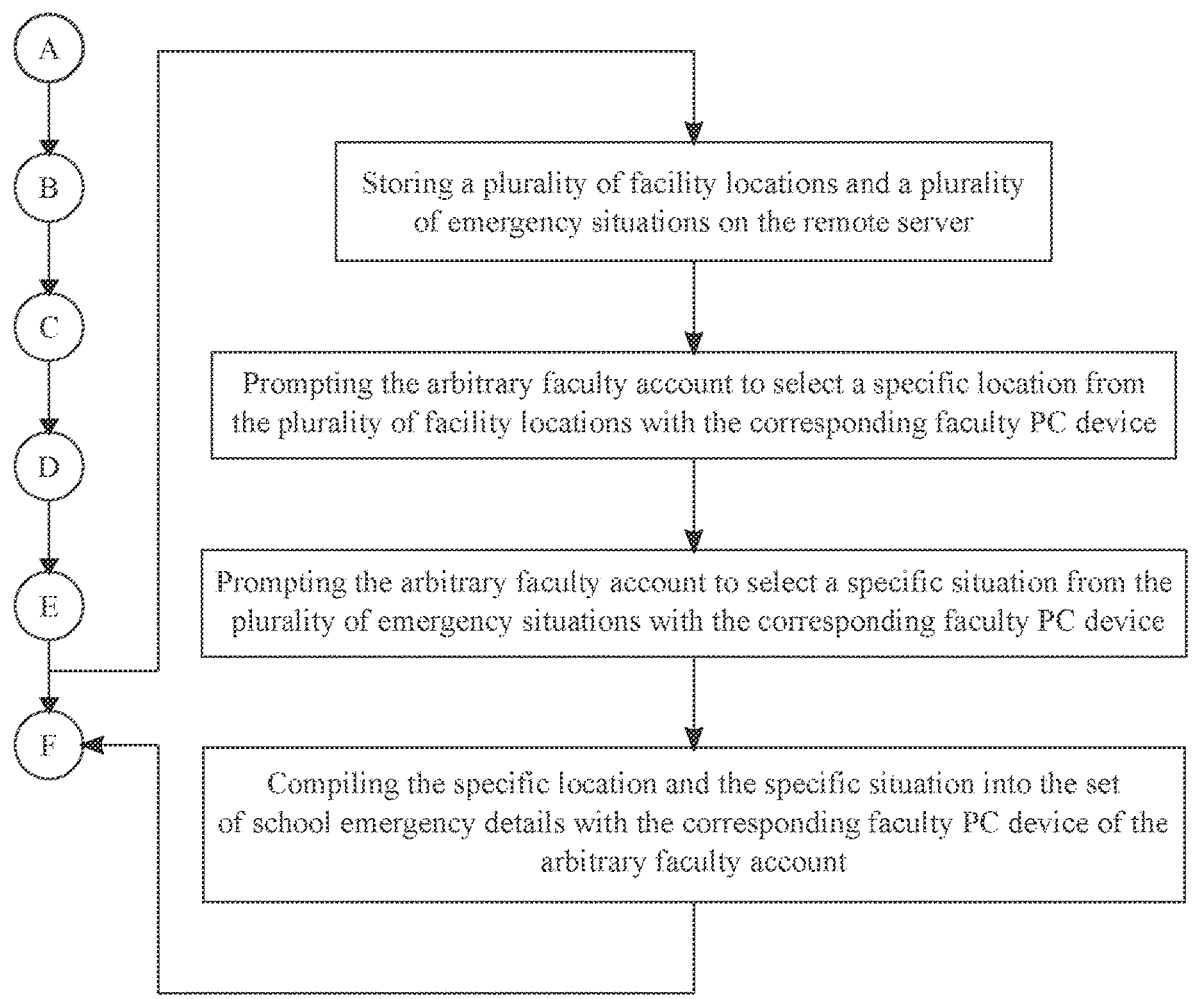
FIG. 5 is a flowchart displaying a subprocess how a faculty member an input details of an emergency.

With reference to FIG. 5, a plurality of facility locations and a plurality of emergency situations is stored on the remote server. The plurality of facility locations is a set of locations of an education institution such as, but not limited to, the main hall or west wing of an education institution. The plurality of emergency situations is a set of situations that can potential be an emergency such as, but not limited to, a person armed with a gun on the grounds of educational institution, a suspicious package, a suspicious person, a fire, or an explosive device. The corresponding faculty PC device prompts the arbitrary faculty account to select a specific location from the plurality of facility locations. This allows the faculty member with the arbitrary faculty account to detail exactly where the emergency is occurring. Further, the corresponding faculty PC device prompts the arbitrary faculty account to select a specific location from the plurality of emergency situations. This allows the faculty member with the arbitrary faculty account to detail what type of emergency is occurring. The specific location and the specific situation are compiled into the set of school emergency details with the corresponding faculty PC device of the arbitrary faculty account. This properly informs students with a student account and faculty members with a faculty account of the emergency with the set of school emergency details.

Figure 6:
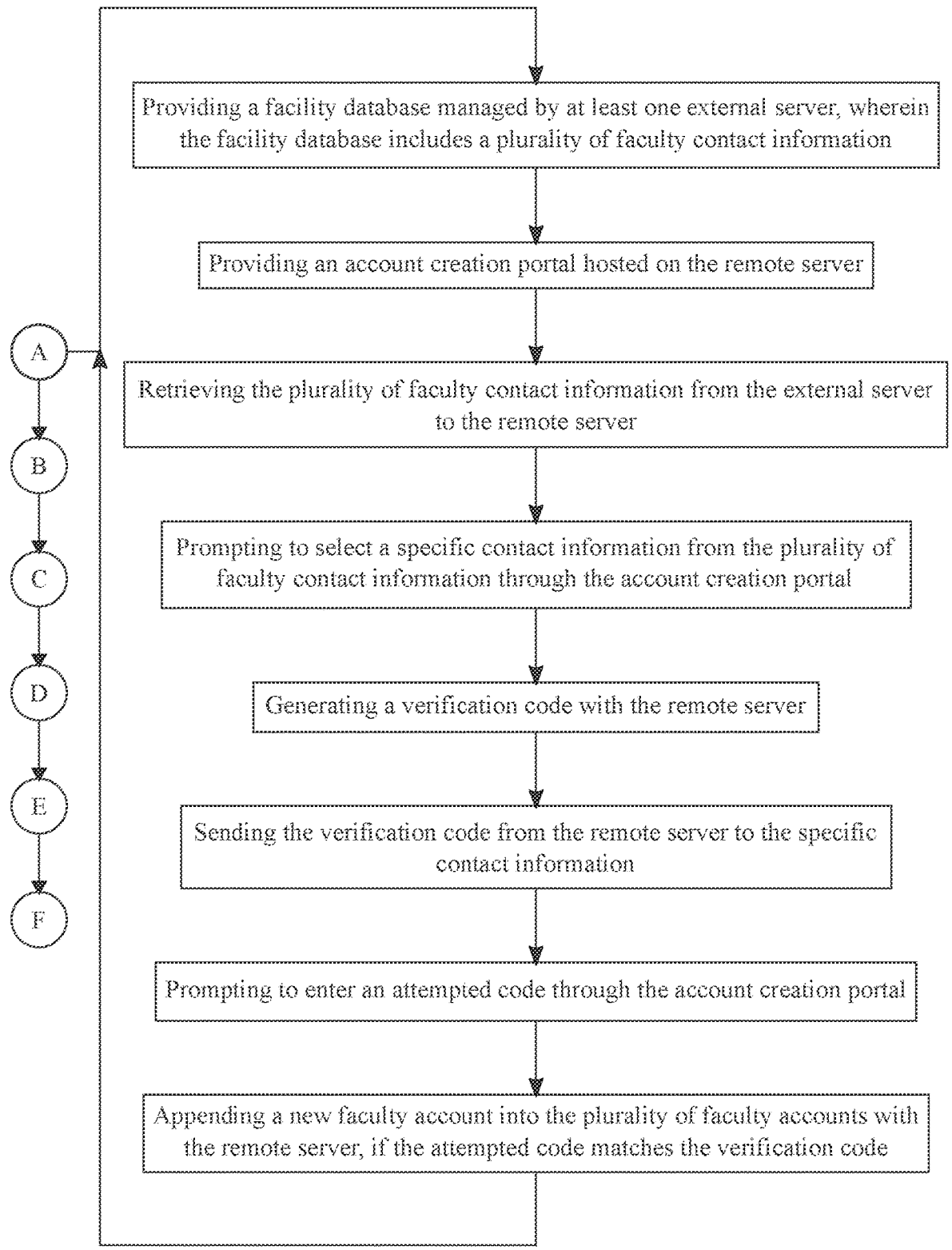
FIG. 6 is a flowchart displaying a subprocess how a faculty member creates and authenticates a faculty account.

With reference to FIG. 6, at least one external server is used to provide a facility database. The facility database is a data storage system of an educational institution. The facility database includes a plurality of faculty contact information as well as exact locations or areas a facility would like to include. The plurality of faculty contact information is a set of information including, but not limited to, phone numbers and email addresses of each faculty member of an educational institution. An account creation portal is hosted on the remote in order to allow a user to create a faculty account. The account creation portal is a platform where users can create new accounts in order to use the present invention. The remote server retrieves the plurality of faculty contact information from the external server in order for the plurality of faculty contact information to be used to verify a faculty account. The account creation portal prompts to select a specific contact information from the plurality of faculty contact information. In further detail, a faculty member, creating a faculty account, is able to select his or her specific contact information. The remote server creates a verification code with the remote server. The verification code may be an alphanumeric set of characters. The verification code is sent from the remote server to the specific contact information. In further detail, the verification code is preferably sent to the default message service of the computing device being used to create a faculty account. The account creation portal prompts to enter an attempted code. The attempted code is an inputted set of alphanumeric characters and symbols by a user attempting to create a new account. If the attempted code matches the verification code, a new faculty account is appended into the plurality of faculty accounts with the remote server. The new faculty account must be verified because only faculty accounts have credentials to initiate the school emergency alarm and the emergency resolution notification. Once the new faculty account has been verified, the user of the new faculty account can choose four locations, as locations where the user most resides, from the plurality of facility locations.

Figure 7:
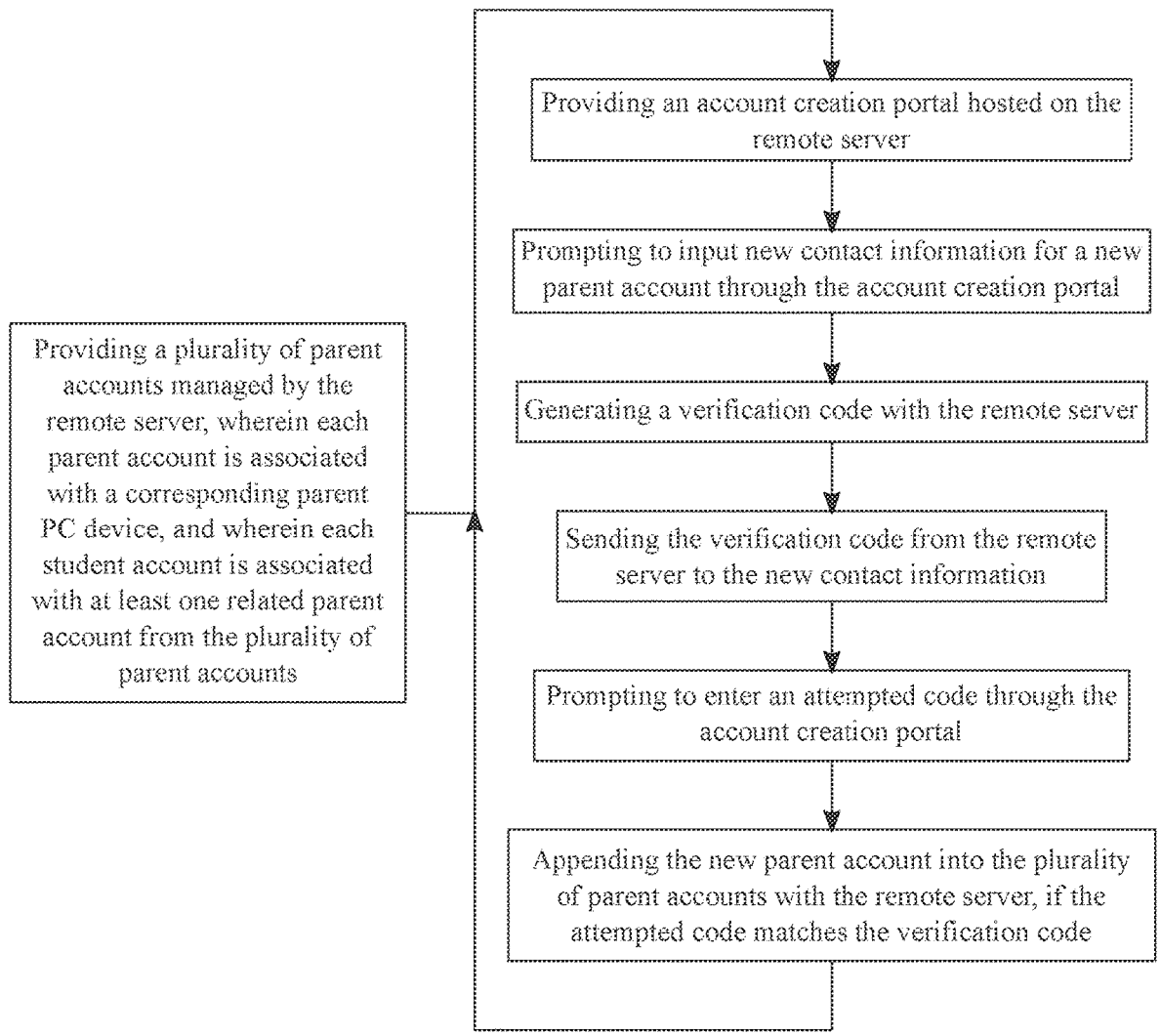
FIG. 7 is a flowchart displaying a subprocess how a parent creates and authenticates a parent account.

Similarly and with reference to FIG. 7, the account creation portal can be used to create and authenticate a parent account. The account creation portal prompts to input new contact information for a new parent account. In further detail, a parent, creating a parent account, is able to enter his or her contact information such as, but not limited to, an email address and/or phone number. The remote server generates a verification code with the remote server. The verification code is sent from the remote server to the new contact information. In further detail, the verification code is preferably sent to the default messaging service of the computing device being used to create a parent account. The account creation portal prompts to enter an attempted code. If the attempted code matches the verification code, the new parent account is appended into the plurality of parent accounts with the remote server.

Figure 8:
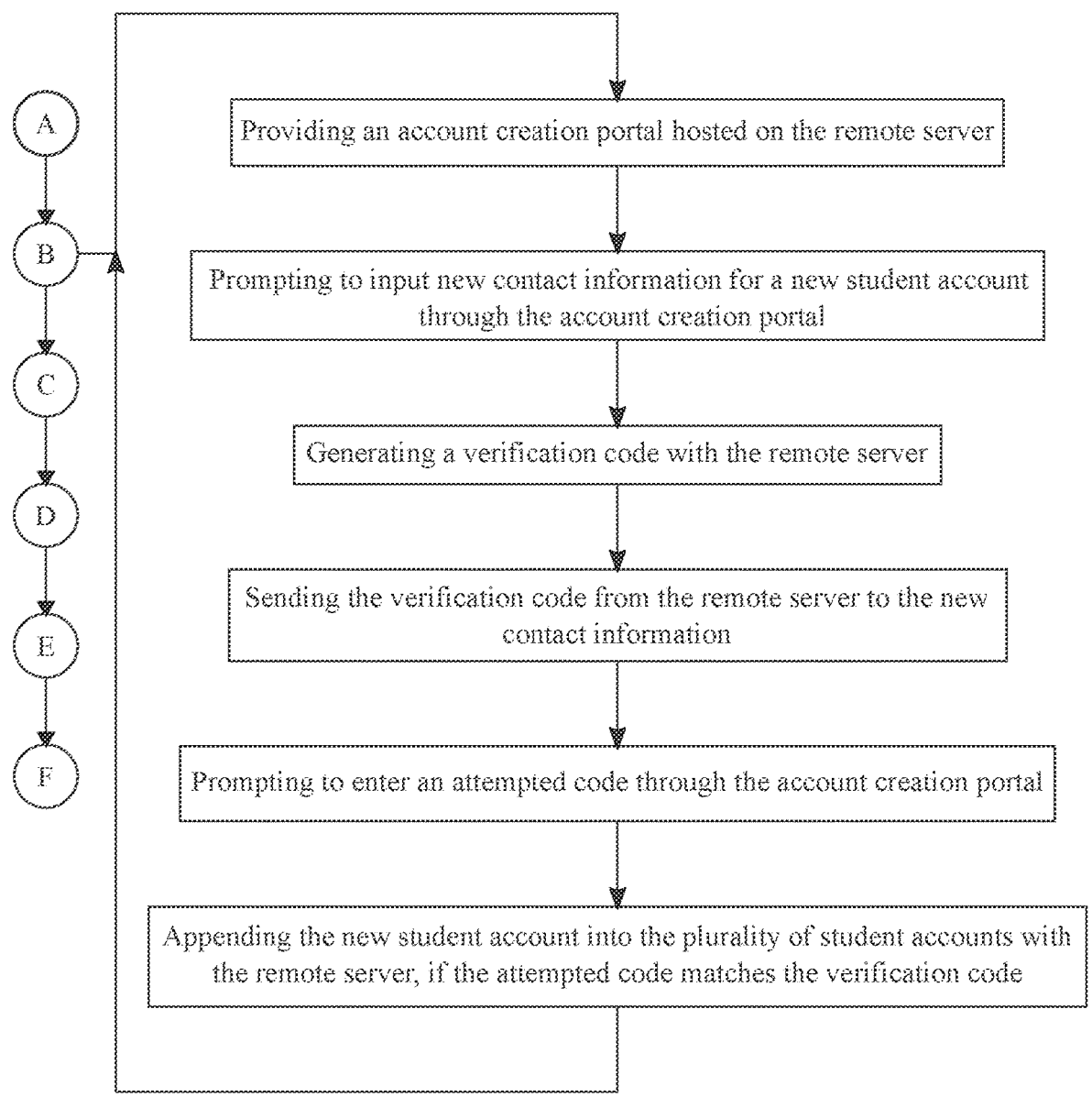
FIG. 8 is a flowchart displaying a subprocess how a student creates and authenticates a student account.

Similarly and with reference to FIG. 8, the account creation portal can be used to create and authenticate a student account. The account creation portal prompts to input new contact information for a new student account. In further detail, a student, creating a student account, is able to enter his or her contact information such as, but not limited to, an email address and/or phone number. The remote server generates a verification code with the remote server. The verification code is sent from the remote server to the new contact information. In further detail, the verification code is preferably sent to the default messaging service of the computing device being used to create a student account. The account creation portal prompts to enter an attempted code. If the attempted code matches the verification code, the new student account is appended into the plurality of student accounts with the remote server.

The remote server can include a list of facilities, wherein each facility includes a facility database. Furthermore, the facility database includes a plurality of student information. In this embodiment, a student, creating a student account, can select a specific facility from the list of facilities through the account creation portal. Moreover, a student, creating a student account, can select his or her name from the plurality of student information in order to create a new student account. The student, creating a student account, can verify the new student account with his or her contact information as mentioned previously.

Each facility from the list of facilities is unique as to their educational institution location and size. Due to this, each facility provides a plurality of facility locations. The plurality of facility locations can include information such as, but not limited to, building names, building numbers, and room numbers. This information is stored on the remote server. Additionally, each faculty member with a faculty account, when signing up, can add his or her own personal locations, as to where each faculty member are most likely to be on any given day, to the plurality of facility locations. This allows a faculty member with a faculty account to quickly select a specific location from the plurality of facility locations after initiating the school emergency alarm. If the faculty member with a faculty account is not at one of his or her personal locations, there is an option to begin typing in the location of the emergency. As the faculty member with a faculty account begins typing, the plurality of locations will begin to appear based on the alphanumeric characters inputted by the faculty member in order for the faculty member to quickly choose a specific location.

After the school emergency alarm is initiated and as mentioned previously, each student with a student account and each faculty member with a faculty account receives an automated text message providing them details of the emergency. As the emergency progresses, the arbitrary faculty account or another faculty account has the option to input a new location from the plurality of facility locations and a new set of school emergency details if the location or condition of the emergency changes.

A parent with a parent account has the option to register his or her child (children) after creating a parent account. Moreover, a parent with a parent account is able to register multiple children and multiple educational institutions if needed. Additionally, a parent with a parent account is able to choose how he or she gets notified through the present invention. In further detail, a parent with a parent account can choose to be notified through an email and/or through a text message.

Figure 9:
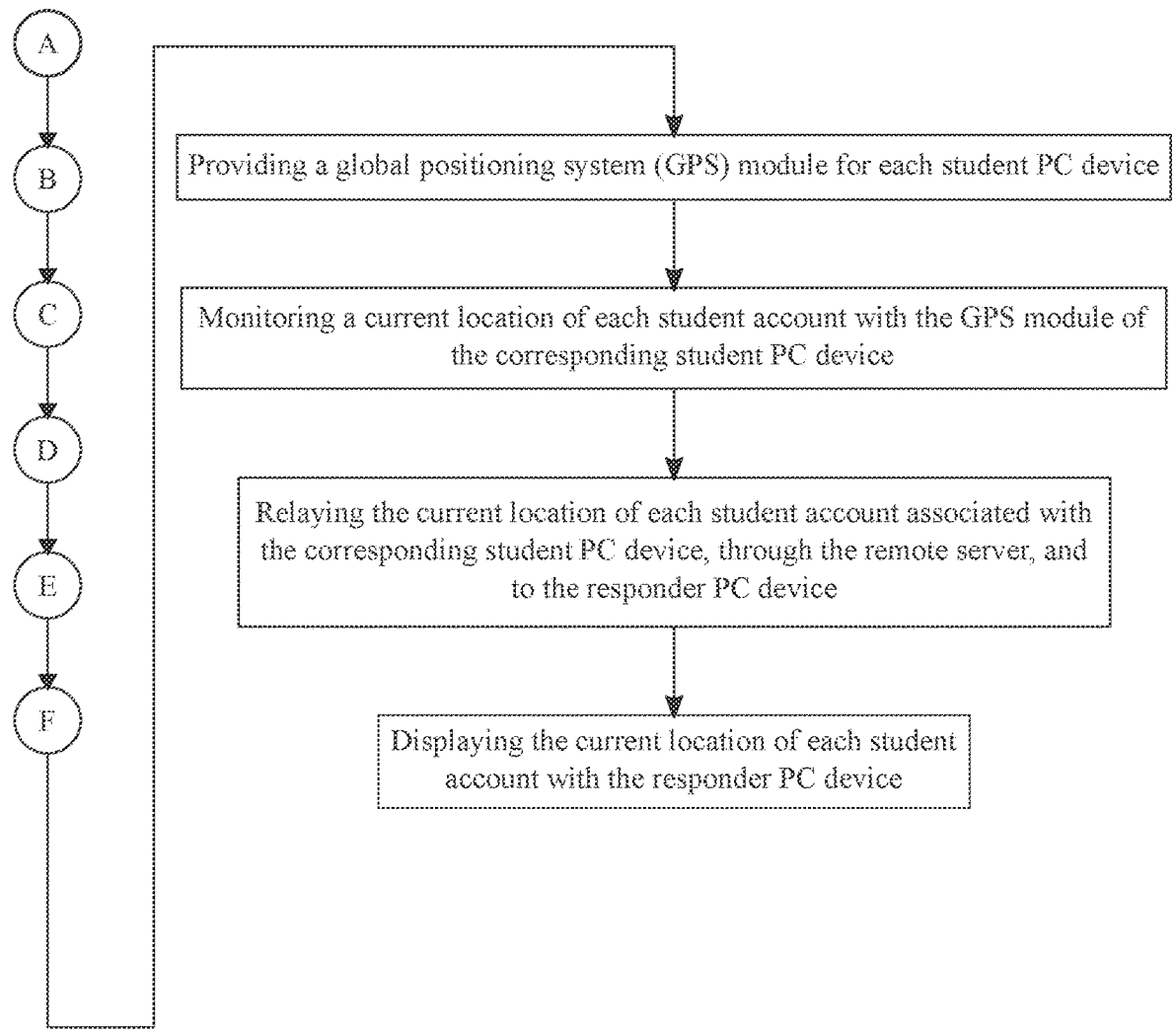
FIG. 9 is a flowchart displaying a subprocess how a first responder can locate students during an emergency.

In order for a first responder to know where each student is during an emergency and with reference to FIG. 9, a GPS module is provided for each student PC device. The current location of each student account is monitored with the GPS module of the corresponding student PC device. The current location is the real-time physical position of the corresponding student PC device of each student account. The current location of each student account associated is relayed with the corresponding student PC device, through the remote server, and to the responder PC device. This step provides a first responder with the real-time physical positioning of each student during an emergency. The current location of each student account is displayed with the responder PC device. In further detail, the current location of each student account is displayed in map format where a first responder can visually locate each student when traversing through a school facility during an emergency.

Figure 10:
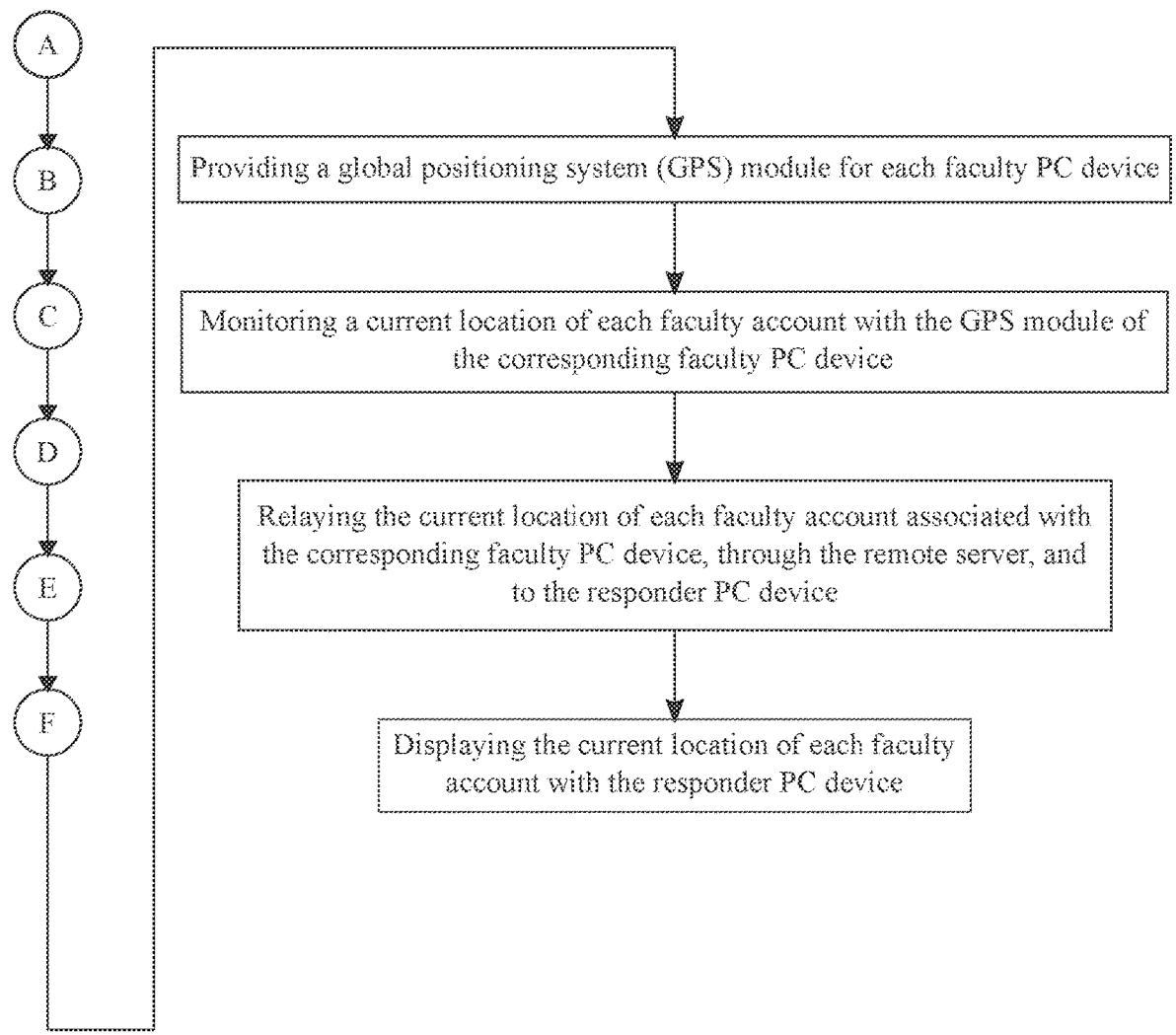
FIG. 10 is a flowchart displaying a subprocess how a first responder can locate faculty members during an emergency.

In order for a first responder to know where each faculty member is during an emergency and with reference to FIG. 10, a GPS module is provided for each faculty PC device. The current location of each faculty account is monitored with the GPS module of the corresponding faculty PC device. The current location is the real-time physical position of the corresponding faculty PC device of each faculty account. The current location of each faculty account associated is relayed with the corresponding faculty PC device, through the remote server, and to the responder PC device. This step provides a first responder with the real-time physical positioning of each faculty member during an emergency. The current location of each faculty account is displayed with the responder PC device. In further detail, the current location of each faculty account is displayed in map format where a first responder can visually locate each faculty member when traversing through a school facility during an emergency.

Figure 11:
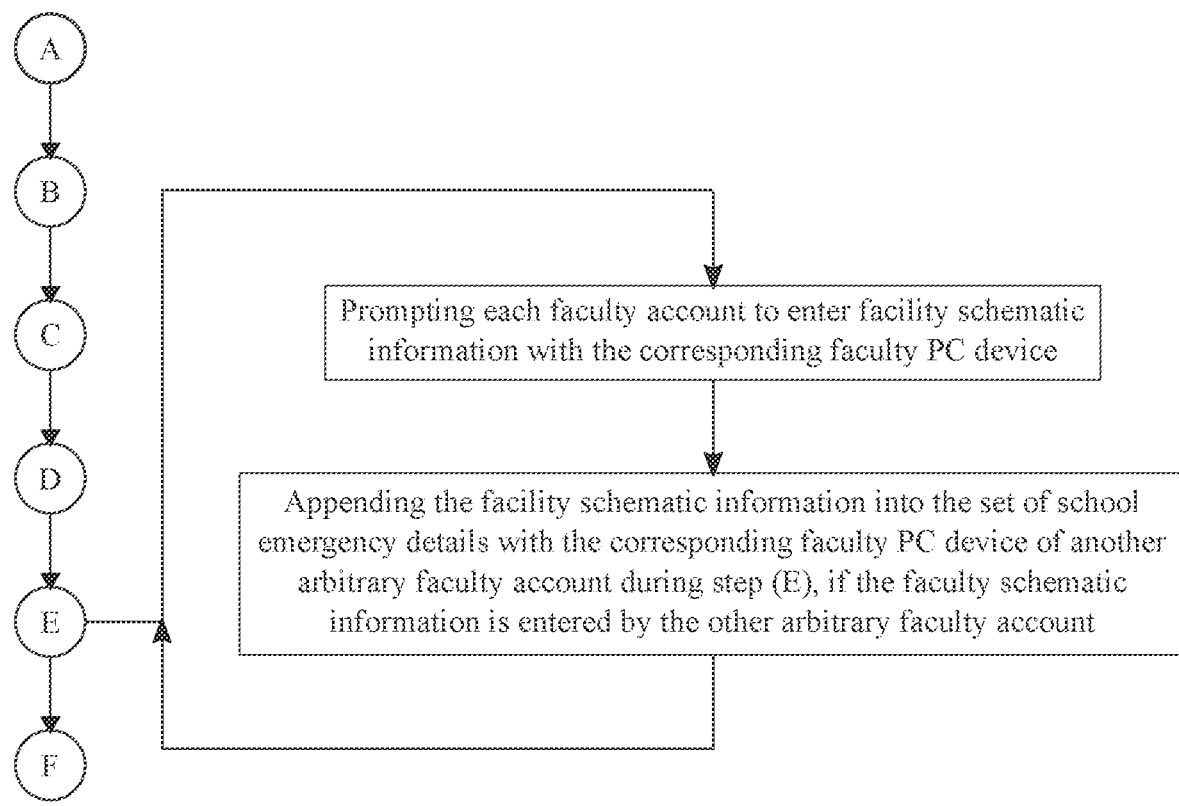
FIG. 11 is a flowchart displaying a subprocess how a faculty member can upload drawings or schematics of a school facility.

The following subprocess allows faculty members of a school facility to upload drawings or schematics in order to aid first responders as they traverse a school facility during an emergency. With reference to FIG. 11, each faculty account is prompted to enter facility schematic information with the corresponding faculty PC device. Facility schematic information can be any drawings or schematics that detail the layout of a school facility. The facility schematic information is appended into the set of school emergency details with the corresponding faculty PC device of another arbitrary faculty account during Step E, if the faculty schematic information is entered by the other arbitrary faculty account. Thus, this step provides first responders with more information of a school facility which aids the first responders when traversing the school facility.

Figure 12:
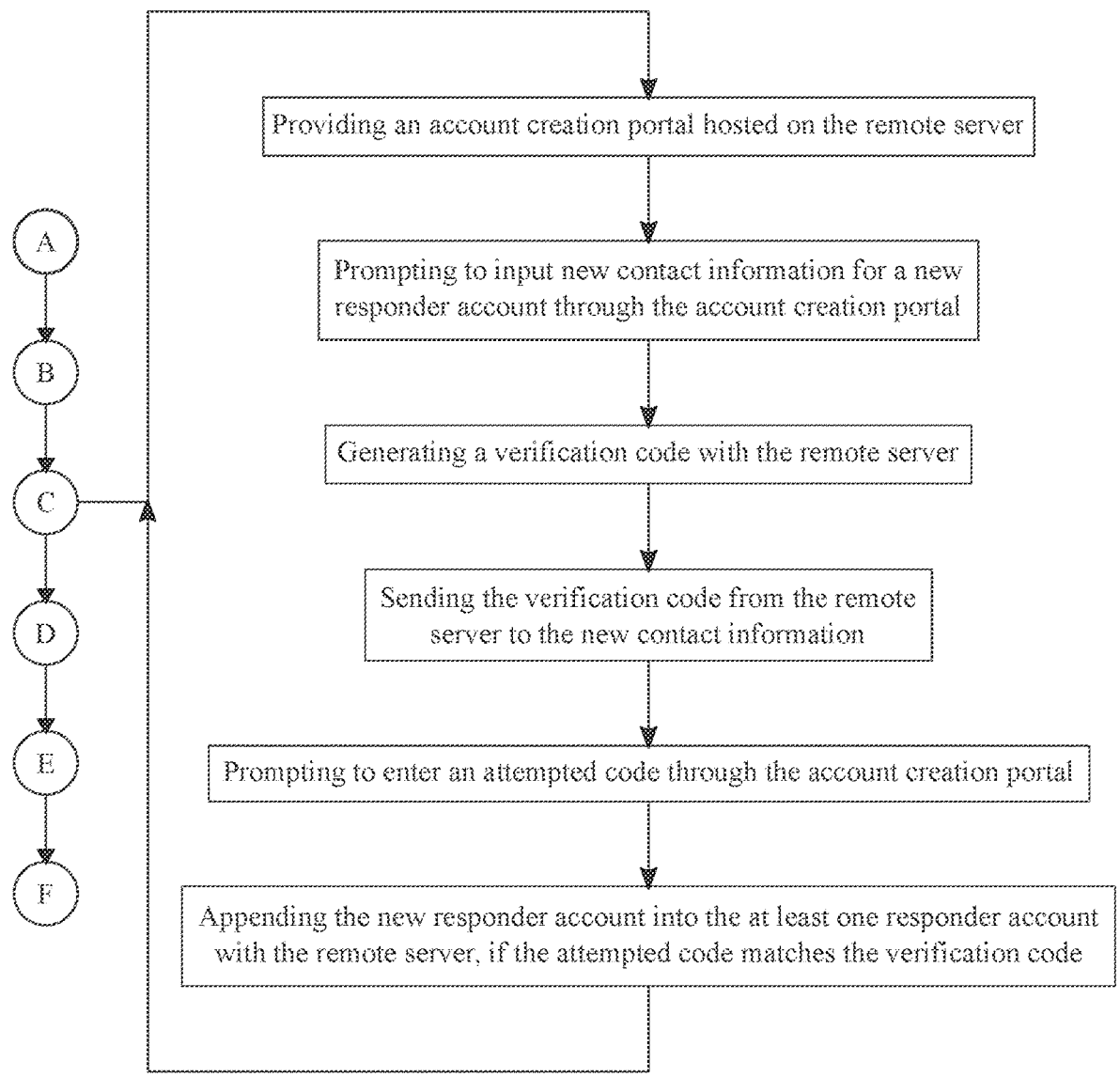
FIG. 12 is a flowchart displaying a subprocess how a first responder creates and authenticates a responder account.

With reference to FIG. 12, the account creation portal can be used to create and authenticate a responder account. The account creation portal prompts to input new contact information for a new responder account. In further detail, a responder, creating a responder account, is able to enter his or her contact information such as, but not limited to, an email address and/or phone number. The remote server generates a verification code with the remote server. The verification code is sent from the remote server to the new contact information. In further detail, the verification code is preferably sent to the default messaging service of the computing device being used to create a responder account. The account creation portal prompts to enter an attempted code. If the attempted code matches the verification code, the new responder account is appended into the at least one responder account with the remote server.

Although the invention has been explained in relation to its preferred embodiment, it is to be understood that many other possible modifications and variations can be made without departing from the spirit and scope of the invention as hereinafter claimed.

What is claimed is:

1. A method of alerting a school emergency, the method comprises steps of:
   (A) managing a plurality of faculty accounts by a remote server and associating a corresponding faculty account among the plurality of faculty accounts with a corresponding faculty personal computing (PC) device among a plurality of faculty PC devices;
   (B) managing a plurality of student accounts by the remote server and associating a corresponding student account among the plurality of student accounts with a corresponding student PC device among a plurality of student PC devices;
   (C) managing at least one responder account by the remote server and associating the responder account with a responder PC device;
   (D) initiating a school emergency alarm by the corresponding faculty account with the corresponding faculty PC device;
   (E) entering a set of school emergency details for the school emergency alarm by an arbitrary faculty account among the plurality of faculty accounts with an arbitrary faculty PC device among the plurality of faculty PC devices associated with the arbitrary faculty account, if the arbitrary faculty account initiates the school emergency alarm in step (D), wherein the arbitrary faculty account is any one from the plurality of faculty accounts; and
   (F) relaying the school emergency alarm and the set of school emergency details from the arbitrary faculty PC device associated with the arbitrary faculty account, through the remote server, to the corresponding student PC device associated with the corresponding student account, to the corresponding faculty PC device associated with the corresponding faculty account, and to the responder PC device.

2. The method as claimed in claim 1 comprises steps of:
   managing a plurality of parent accounts by the remote server and associating a corresponding parent account among the plurality of parent accounts with a corresponding parent PC device among a plurality of parent PC devices and associating the corresponding student account with the corresponding parent account;
   initiating an emergency resolution notification by the corresponding faculty account with the corresponding faculty PC device;
   generating the emergency resolution notification with the remote server, wherein the emergency resolution notification includes the set of school emergency details; and
   relaying the emergency resolution notification from the remote server to the corresponding parent device associated with the corresponding parent account.

3. The method as claimed in claim 2 comprises steps of:
   providing a global positioning system (GPS) module for the corresponding student PC device associated with the corresponding student account;

monitoring a current location of the corresponding student account with the GPS module of the corresponding student PC device; and relaying the current location from the student PC device associated with the corresponding student account, through the remote server, and to the corresponding parent PC device associated with the corresponding parent account.

4. The method as claimed in claim 1 comprises steps of:

storing a plurality of facility locations and a plurality of emergency situations on the remote server;

prompting the arbitrary faculty account to select a specific location from the plurality of facility locations with the corresponding faculty PC device;

prompting the arbitrary faculty account to select a specific situation from the plurality of emergency situations with the corresponding faculty PC device; and compiling the specific location and the specific situation into the set of school emergency details with the corresponding faculty PC device of the arbitrary faculty account.

5. The method as claimed in claim 1 comprises steps of:

storing a plurality of facility locations and a plurality of emergency situations on the remote server;

prompting the arbitrary faculty account to select a specific location from the plurality of facility locations with the corresponding faculty PC device;

prompting the arbitrary faculty account to select a specific situation from the plurality of emergency situations with the corresponding faculty PC device; and compiling the specific location and the specific situation into the set of school emergency details with the corresponding faculty PC device of the arbitrary faculty account.

6. The method as claimed in claim 1 comprises steps of:

providing a facility database managed by at least one external server, wherein the facility database includes a plurality of faculty contact information;

providing an account creation portal hosted on the remote server;

retrieving the plurality of faculty contact information from the external server to the remote server;

prompting to select a specific contact information from the plurality of faculty contact information through the account creation portal;

generating a verification code with the remote server;

sending the verification code from the remote server to the specific contact information;

prompting to enter an attempted code through the account creation portal; and appending a new faculty account into the plurality of faculty accounts with the remote server, if the attempted code matches the verification code.

7. The method as claimed in claim 1 comprises steps of:

providing an account creation portal hosted on the remote server;

prompting to input new contact information for a new parent account through the account creation portal;

generating a verification code with the remote server;

sending the verification code from the remote server to the new contact information;

prompting to enter an attempted code through the account creation portal; and appending the new parent account into the plurality of parent accounts with the remote server, if the attempted code matches the verification code.

8. The method as claimed in claim 1 comprises steps of:

providing an account creation portal hosted on the remote server;

prompting to input new contact information for a new student account through the account creation portal;

generating a verification code with the remote server;

sending the verification code from the remote server to the new contact information;

prompting to enter an attempted code through the account creation portal; and appending the new student account into the plurality of student accounts with the remote server, if the attempted code matches the verification code.

9. The method as claimed in claim 1 comprises steps of:

providing a global positioning system (GPS) module for each student PC device;

monitoring a current location of each student account with the GPS module of the corresponding student PC device;

relaying the current location of each student account associated with the corresponding student PC device, through the remote server, and to the responder PC device; and displaying the current location of each student account with the responder PC device.

10. The method as claimed in claim 1 comprises steps of:

providing a global positioning system (GPS) module for each faculty device;

monitoring a current location of each faculty account with the GPS module of the corresponding faculty PC device;

relaying the current location of each faculty account associated with the corresponding faculty PC device, through the remote server, and to the responder PC device; and displaying the current location of each faculty account with the responder PC device.

11. The method as claimed in claim 1 comprises steps of:

prompting each faculty account to enter facility schematic information with the corresponding faculty PC device;

appending the facility schematic information into the set of school emergency details with the corresponding faculty PC device of another arbitrary faculty account during step (E), if the faculty schematic information is entered by the other arbitrary faculty account.

12. The method as claimed in claim 1 comprises steps of:

providing an account creation portal hosted on the remote server;

prompting to input new contact information for a new responder account through the account creation portal;

generating a verification code with the remote server;

sending the verification code from the remote server to the new contact information;

prompting to enter an attempted code through the account creation portal; and appending the new responder account into the at least one responder account with the remote server, if the attempted code matches the verification code.

* * * * *